Oct. 5, 1926.

T. L. CARBONE

ELECTRIC ARC LAMP

Filed Nov. 25, 1922

1,602,100

Inventor
T. L. Carbone:
by
W. E. Evans:
Attorney.

Patented Oct. 5, 1926.

1,602,100

UNITED STATES PATENT OFFICE.

TITO LIVIO CARBONE, DECEASED, LATE OF BERLIN, GERMANY; BY ERNST MOMMSEN, EXECUTOR, OF CHARLOTTENBURG, GERMANY.

ELECTRIC-ARC LAMP.

Application filed November 25, 1922, Serial No. 603,359, and in Germany July 18, 1922.

Many attempts have been made to employ electric arc lamps provided with electrodes which contain as large a percentage as possible of illuminating salts and, notwithstanding the gases which are evolved, to keep the globes as free from deposits as possible. For this purpose the globes of these arc lamps are specially constructed and provided above the zone of the arc with a recipitating or condensing chamber for the waste gases. The upper electrode of the superposed electrodes is also provided with a plate (a shield or the like) which surrounds it and which exerts in the known manner a favourable action on the arc and the combustion of the carbons. The upper electrode, which is guided accurately in a vertical direction in the cover of the lamp casing, is passed freely through an aperture in the plate (shield or the like). When electrodes which are strongly impregnated with illuminating salts are employed the phenomenon is observed that deposits adhere between the inner surface of the aperture in the plate which surrounds the upper electrode and the electrode itself and hinder the free passage of the electrode through it. The regulating mechanism and the quiet burning of the lamp are naturally affected thereby.

In order to overcome this disadvantage, according to the present invention, the plate which surrounds the upper electrode is not connected rigidly to the casing as heretofore, but at least partly movably. If, now, the electrode should become gripped by the accumulation of deposits in the intermediate space between the inner surface of the aperture in the plate and the electrode, the plate will yield in consequence of the manner in which it is connected so as to be movable, and will be moved and thus scrape off the deposits which are thrown down in the form of fine dust so that the free passage or feed of the upper electrode through the aperture can take place. The plate which surrounds the upper electrode may with advantage be suspended from the cover of the lamp casing by means of suitable chain-like annular members, whereby the free movement of the plate is ensured. The plate which surrounds the upper electrode consists of several pieces, and some or all the parts of the plate may be suspended so as to be freely movable.

A constructional example according to the invention is shown in the accompanying drawings in which—

Figure 1:
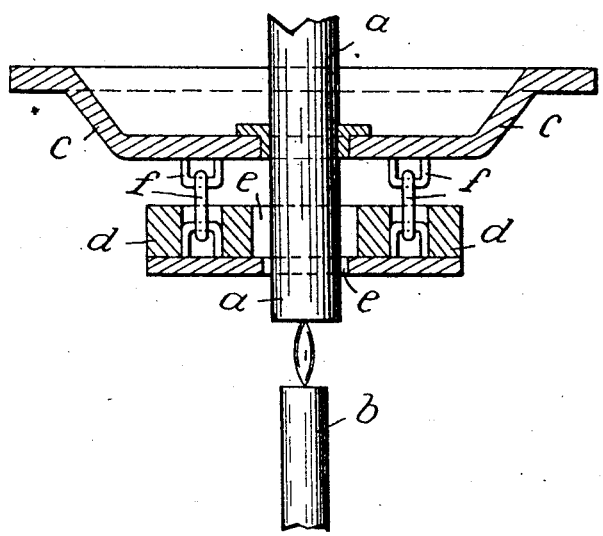
Figure 2:
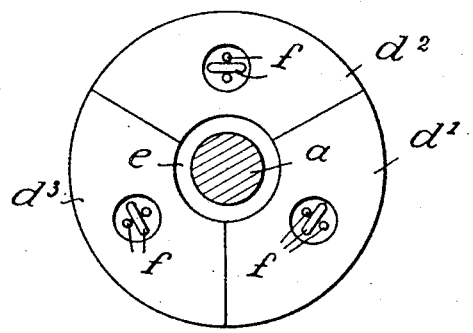

Figure 1 is a longitudinal section of the part of an arc lamp to which the invention applies and Figure 2 is a plan view of the plate surrounding the upper electrode.

In the electric arc lamp shown in the drawings the two superposed electrodes $a$ and $b$ are maintained in the desired relative position under the control of a suitable regulating mechanism in the known manner. The upper electrode $a$ is guided in the cover $c$ of the lamp casing and is surrounded by a plate, for example, a shield $d$ of the usual construction. The gases which are evolved tend to rise between the upper electrode $a$ and the wall of the aperture $e$ in the plate $d$ and to be deposited in the form of a fine dust. This deposit in the aperture $e$ interferes with the free passage of the electrode through it and the result is that the smooth burning of the arc lamp may be affected. In order to overcome this disadvantage the plate $d$ is suspended from the cover plate $c$ so as to be freely movable, by means of the chain-like members $f$, for example. When the deposit collects in the aperture $e$ the plate $d$ moves and scrapes the deposit away.

The plate $d$ which surrounds the upper electrode $a$ may consist of one piece or of several pieces, for instance, as shown in Figure 2, in which it consists of three parts $d^1$, $d^2$, $d^3$ each of which is suspended in the freely movable manner hereinbefore described.

I claim as the invention of TITO LIVIO CARBONE:

1. In an electric arc-lamp, the combination of the upper carbon with an annular member surrounding said carbon near its lower end and consisting of several segments, each of which is suspended from a stationary lamp-part located above it, at least one of said segments being tiltable and movable horizontally whereby on a deposit being formed between the said upper carbon and the said annular member the feed movement of the said upper carbon is transmitted to the said tiltable and movable part whereby the connection formed by the said deposit between the said upper carbon and the said annular member is broken.

2. In an electric arc-lamp, the combination of the upper carbon with an annular member surrounding said carbon near its lower end and consisting of several segments, each of which is suspended movably from a stationary lamp-part located above it so as to be tiltable and movable radially whereby on a deposite being formed between the said upper carbon and the said annular member the feed movement of the said upper carbon is transmitted to the said tiltable and movable part whereby the connection formed by the said deposit between the said upper carbon and the said annular member is broken.

3. In an electric arc-lamp, the combination of the upper carbon with an annular member surrounding said carbon near its lower end and consisting of several segments, each of which is suspended by chain-like members from a stationary lamp-part located above it so as to be tiltable and movable radially whereby on a deposite being formed between the said upper carbon and the said annular member the feed movement of the said upper carbon is transmitted to the said tiltable and movable part whereby the connection formed by the said deposit between the said upper carbon and the said annular member is broken.

4. In an electric arc-lamp, the combination of the upper carbon with an annular member surrounding said carbon near its lower end and consisting of several segments, each of which is suspended from the bottom of an upper lamp-casing, at least one of said segments being tiltable and movable horizontally whereby on a deposit being formed between the said upper carbon and the said annular member the feed movement of the said upper carbon is transmitted to the said tiltable and movable part whereby the connection formed by the said deposit between the said upper carbon and the said annular member is broken.

5. In an electric arc-lamp, the combination of the upper carbon with an annular member surrounding said carbon near its lower end and consisting of several segments, each of which is suspended by chain-like members from the bottom of an upper lamp-casing, at least one of said segments being tiltable and movable horizontally whereby on a deposit being formed between the said upper carbon and the said annular member the feed movement of the said upper carbon is transmitted to the said tiltable and movable part whereby the connection formed by the said deposit between the said upper carbon and the said annular member is broken.

DR. ERNST MOMMSEN,
*Executor of the Last Will and Testament of Tito Livio Carbone.*